United States Patent Office 2,992,714
Patented July 18, 1961

2,992,714
SYNCHRONIZER FOR TRANSMISSION MECHANISMS
Lucien Péras, Billancourt, France, assignor to Regie Nationale des Usines Renault, Billancourt, France
Filed Sept. 29, 1958, Ser. No. 763,965
Claims priority, application France Oct. 15, 1957
4 Claims. (Cl. 192—53)

This invention relates to synchronizing devices for transmission mechanisms, notably for change-speed mechanisms, and provides an improved device of this character which is simple in design and efficient in operation, particularly in that the change from one gear to another is considerably accelerated and facilitated.

According to a specific feature of this invention, the synchronizing cones are carried by the gears to be synchronized and by the sliding hub, respectively, and besides these cones have outer diameters considerably greater than those of the gear dogs.

The synchronizing cones associated with the gears are adapted to slide on dogs solid with these gears but are retained in a position preparatory to the speed engagement in which they are urged by spring-loaded bolts, due to a locking action resulting from the provision of radial pins arranged on the path of movement of the synchronizing cones, these cones being unable to clear said pins in the axial direction unless notches formed in their sides register exactly with said pins. To this end, the synchronizing cones may be displaced angularly to a moderate extent whereby they can move from one position in which they abut against the pin as long as the synchronization is not ensured to a position in which they can move past this pin due to the presence of their notches and under the thrust imparted thereto by the synchronizing cone of the sliding hub.

The synchronizing cones of the gears are held on the corresponding dogs by shoulders formed on the end of the dog teeth and adapted to be cleared by the cones, when assembling the component elements of the device, due to the provision of offset teeth.

With this arrangement, it is a simple matter to provide large-diameter cones whereby the efficiency and rapidity of operation or control is increased considerably.

Moreover, with this arrangement small-diameter dogs disposed as close as possible to each other may be provided, thus increasing considerably the stability of the sliding hub and the smoothness of the gear engagement, resulting in an easier gear-change.

Finally, the synchronizer according to this invention consists of extremely simple elements that can be manufactured at low cost; thus, for example, the cones may be made of sintered alloy or metal.

Other features and advantages of this invention will become apparent as the following description proceeds with reference to the attached drawing forming part of this specification and illustrating diagrammatically by way of example a synchronizer constructed according to the teachings of this invention. In the drawing.

Figure 1:
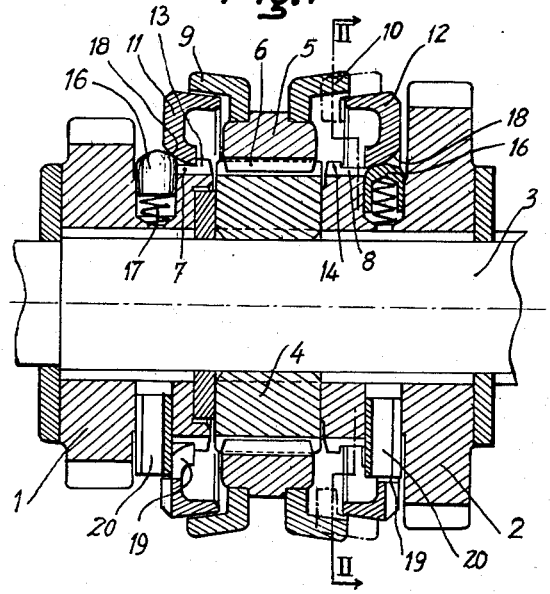
FIGURE 1 is an axial section showing the synchronizer.

Referring first to FIG. 1 showing the general arrangement of the synchronizing device forming the subject-matter of this invention, a pair of gears 1, 2 to be synchronized are mounted for free rotation on a shaft 3 rotating bodily with the synchronizer hub 4 carrying the sliding hub 5.

The teeth or dogs 6 of the sliding hub 5 correspond to the teeth or dogs 7, 8 carried by the gears 1 and 2 respectively.

Figure 2:
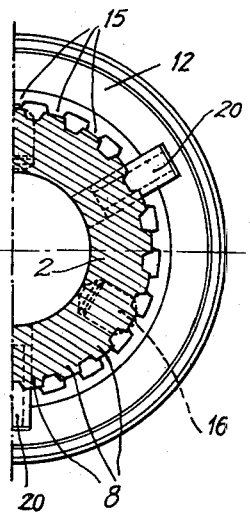
FIGURE 2 is a half vertical section taken upon the line II—II of FIG. 1 and showing the mounting of a sliding synchronizing cone.

This sliding hub 5 carries in addition cones 9, 10 forming an integral part thereof and adapted to co-act with the correspondingly tapered faces of synchronizing rings 11, 12 respectively, mounted on the gears 1 and 2 in the manner set forth hereafter. These rings are held laterally on the sliding-hub side by a shoulder 13, 14 formed endwise of the dogs 7, 8; they are also formed with an inner set of teeth, as shown at 15 in FIG. 2 in the case of ring 12, which are adapted to engage the corresponding dogs and to be locked by relative rotation through the value of one tooth, thereby causing their teeth to register with the toothed shoulders 13, 14.

These rings are constantly urged in the axial direction towards the sliding hub 5 by a set of radial bolts 16 responsive to springs 17 and slidably mounted in the gears; these bolts 16 are urged not only by the springs 17 but also by the centrifugal force during the operation of the mechanism against cam faces 18 formed on the rings, as shown in FIG. 1.

These spring-urged bolts 16 and the cam faces 18 are so shaped that in the neutral position the return force applied to the rings is relatively important, and that when a gear or speed is engaged, this force is relatively small (in order to prevent the sliding hub from disengaging the dog meshing) while remaining however sufficient to ensure the return to the neutral position when desired. In this respect, it will be noted that FIG. 1 shows the sliding hub 5 and ring 11 in the neutral position, the ring 12 being in the position of engagement of a gear or speed; however, this is only imaginary and corresponds to the chain-dotted line position of the cone 10 of the sliding hub.

The force with which these synchronizing rings are urged towards the sliding hub increases with the velocity of rotation of the gears to be synchronized due to the increase in the centrifugal force acting on the bolts 16. Thus, the higher the vehicle speed, the faster is the synchronizer setting.

On the other hand, these rings are held in position by the engagement of the side faces of notches 19 formed therein (there being three notches 19 in this case) against elastic pins 20 inserted radially after the mounting of the rings and adapted to pass freely through the notches 19 of these rings.

Figure 3:
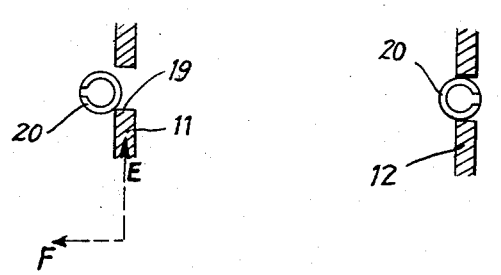
FIGURE 3 is a diagrammatic view showing the relative positions in which the synchronizing cones may be placed during the operation and in relation to the pins, these positions corresponding to those illustrated in FIG. 1.

Due to the axial offset of the rings in the neutral position relative to the plane of the abutment pins 20, the notches 19 permit an angular play of the rings 11, 12 which is taken up in one or the other direction when their tapered surfaces contact the sliding hub, as shown in FIG. 3 in the case of ring 11.

Actually, the setting movement, that is, the rotation of the synchronizing ring until the abutment pins 20 contact the side faces of notches 19, takes place immediately as the tapered surfaces of the ring and sliding hub contact each other during the displacement of the sliding hub.

The synchronizer described hereinabove operates as follows:

The ring 11 and pins 20, during the initial portion of the gear-engagement stroke are positioned, as already explained, as shown in FIG. 3, and the synchronization results from the thrust exerted by the cone 9 of sliding hub 5 against the tapered surface of ring 11 associated with the gear to be synchronized. As illustrated in FIG. 3, the ring 11 cannot recede during the synchronization as the force F applied to the sliding hub is not sufficient to cause on the elastic pin 20 a reaction capable of balancing the force E corresponding to the force of adherence of the co-acting tapered surfaces rotating at different speeds.

When the synchronization is obtained, as the force E is reduced to zero the ring 11 may be moved axially and clear the obstacles previously constituted by the pins 20 (see the imaginary position of ring 12 in FIGS. 1 and 3). Therefore, the sliding hub 5 may continue its axial movement and as the relative contact and interaction between the dog 7 and teeth 6 of the sliding hub have possibly caused the disengagement of the tapered surfaces, the sliding hub can now fit around the dog 7 of gear 1, the desired combination being thus obtained for transmitting the driving or reaction torque through the mechanism.

I claim:

1. A synchronous device for a change speed mechanism comprising a rotatable shaft, a hub member slidably mounted on said shaft for rotation therewith, at least one idler gear mounted on said shaft, said hub member and said gear each having corresponding dog teeth, a synchronization cone integral with said hub member and concentric about the axis of said shaft, a conical synchronization ring concentric about the axis of said shaft around the dog teeth of said gear and axially movable upon said dog teeth, said dog teeth of said gear having at the end thereof close to the hub member peripheral retaining shoulders for said conical ring, said ring having an inner set of dog teeth engaging the crests of the dog teeth of said gear for angular rotation thereon and adapted to engage said shoulders of the dog teeth of said gear to permit easy mounting of said ring by sliding the dog teeth of said ring through the shoulders of the dog teeth of said gear, the dog teeth of said ring being angularly offset from the dog teeth of said gear so that said shoulders axially retain said ring on the dog teeth of said gear, said conical ring having radially disposed notches defined therein, a plurality of pins radially engaged in said notches and in said gear and allowing said conical ring only a limited angular play less than its angular offset with respect to said retaining shoulders, a plurality of resilient elements positioned between said gear and said conical ring to urge said ring against said shoulders, said radial notches defined in said conical ring being capable of axially clearing said pins which in operation ensure the restraint to the axial displacement of said conical ring prior to obtaining synchronization.

2. The combination as recited in claim 1 wherein said resilient elements are of the radial expansion type, said conical ring having an inner cam surface coacting with said resilient elements.

3. The combination as recited in claim 2 wherein said resilient elements have radial bolts coacting with the inner cam surface of said ring, said inner cam surface having a slope to create a strong force urging the return of said ring to its normal position when said hub is not engaged with said gear and a weaker force urging the return of said ring when said hub is engaged with said gear.

4. The combination as recited in claim 3 wherein said radial bolts have masses responsive to centrifugal force increasing the force urging the return of said ring as a function of the speed of said gear.

References Cited in the file of this patent

UNITED STATES PATENTS

| | | |
|---|---|---|
| 1,997,056 | Griswold | Apr. 9, 1935 |
| 2,175,857 | Simpson | Oct. 10, 1939 |
| 2,363,746 | Peterson et al. | Nov. 28, 1944 |
| 2,470,208 | Avila | May 17, 1949 |